(12) United States Patent
Chan et al.

(10) Patent No.: US 6,618,795 B2
(45) Date of Patent: Sep. 9, 2003

(54) METHOD AND APPARATUS FOR CONCURRENT ACCESS TO A SEQUENTIAL DEVICE

(75) Inventors: Nathan Chan, Sunnyvale, CA (US); Paresh J. Desai, San Jose, CA (US); Phillip T. Ingram, San Jose, CA (US); Shinichiro Ken Torii, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/769,687

(22) Filed: Jan. 24, 2001

(65) Prior Publication Data

US 2002/0099906 A1 Jul. 25, 2002

(51) Int. Cl.[7] .............................................. G06F 12/00
(52) U.S. Cl. ............................. 711/162; 711/4; 711/111
(58) Field of Search ............................. 711/4, 162, 207, 711/171, 111

(56) References Cited

U.S. PATENT DOCUMENTS

| | | | | |
|---|---|---|---|---|
| 5,384,669 A | * | 1/1995 | Dunn et al. ................. | 711/171 |
| 5,671,350 A | * | 9/1997 | Wood .......................... | 714/15 |
| 5,757,571 A | * | 5/1998 | Basham et al. ................ | 711/4 |
| 5,758,151 A | * | 5/1998 | Milligan et al. ............ | 709/231 |
| 6,029,229 A | * | 2/2000 | Vishlitzky ................... | 711/207 |
| 6,154,817 A | * | 11/2000 | Mohan et al. .............. | 711/162 |
| 6,366,987 B1 | * | 4/2002 | Tzelnic et al. .............. | 711/162 |

OTHER PUBLICATIONS

Rosenblum et al. "The Design and Implementation of a Log–Structured File System", ACM Transactions on Computer Systems vol. 10 No. 1 Feb. 1992 pp. 26–52.*

Microsoft Tape Format Specification Version 1.00a, revision 1.8, Sep. 15, 2000, pp. 21–49.*

* cited by examiner

Primary Examiner—Donald Sparks
Assistant Examiner—Paul Baker
(74) Attorney, Agent, or Firm—Blakely, Sokoloff, Taylor & Zafman LLP

(57) ABSTRACT

An apparatus a communication bridge which receives a portion of data from at least one source terminal, assigns a data identifier to the data, and causes the data and data identifier to be stored to a tape storage device for subsequent access is disclosed.

18 Claims, 4 Drawing Sheets

METHOD AND APPARATUS FOR CONCURRENT ACCESS TO A SEQUENTIAL DEVICE

FIELD OF THE INVENTION

The field of the present invention relates to sequential tape storage devices.

BACKGROUND OF THE INVENTION

Single tape devices can typically store data from a single source only. The sequential nature of such tape devices does not allow for multiple users to store their data on the same tape at the same time. Problems with existing attempts to write blocks of data to a tape from multiple sources include a lack of preservation of data that might be present after the just-written block.

These difficulties can be seen in single tape devices that are attached to a network, i.e., a LAN or WAN. Under such circumstances, the network-attached device should take into account the multiple access that is possible within such a multi-user environment.

In one approach to the concurrent access problem, the physical layout of the tape is modified to encode the host/sender information.

In effort to reach concurrent access, attempts have been made in various ways. In the realm of tape drives, one way has been to use a large hard drive or other RAM device to temporarily store, or buffer, the data until the tape drive is capable of receiving more data. These approaches, however, rely upon the use of a large RAM device and supporting software. Other approaches in the computer field utilize software to back up hard drives to tape but only allow for sequential access.

Another approach can be seen in audio recording industry. By varying the physical layout of the tape, i.e. through the creation of separate recording tracks, data can be placed on the tape in a helical fashion. This approach is problematic because it requires modification of the tape format and possibly hardware.

SUMMARY OF THE INVENTION

An apparatus including a communication bridge which receives a portion of data from at least one source terminal, assigns a data identifier to the data, and causes the data and data identifier to be stored to a tape storage device for subsequent access is disclosed.

DETAILED DESCRIPTION

Figure 1A:
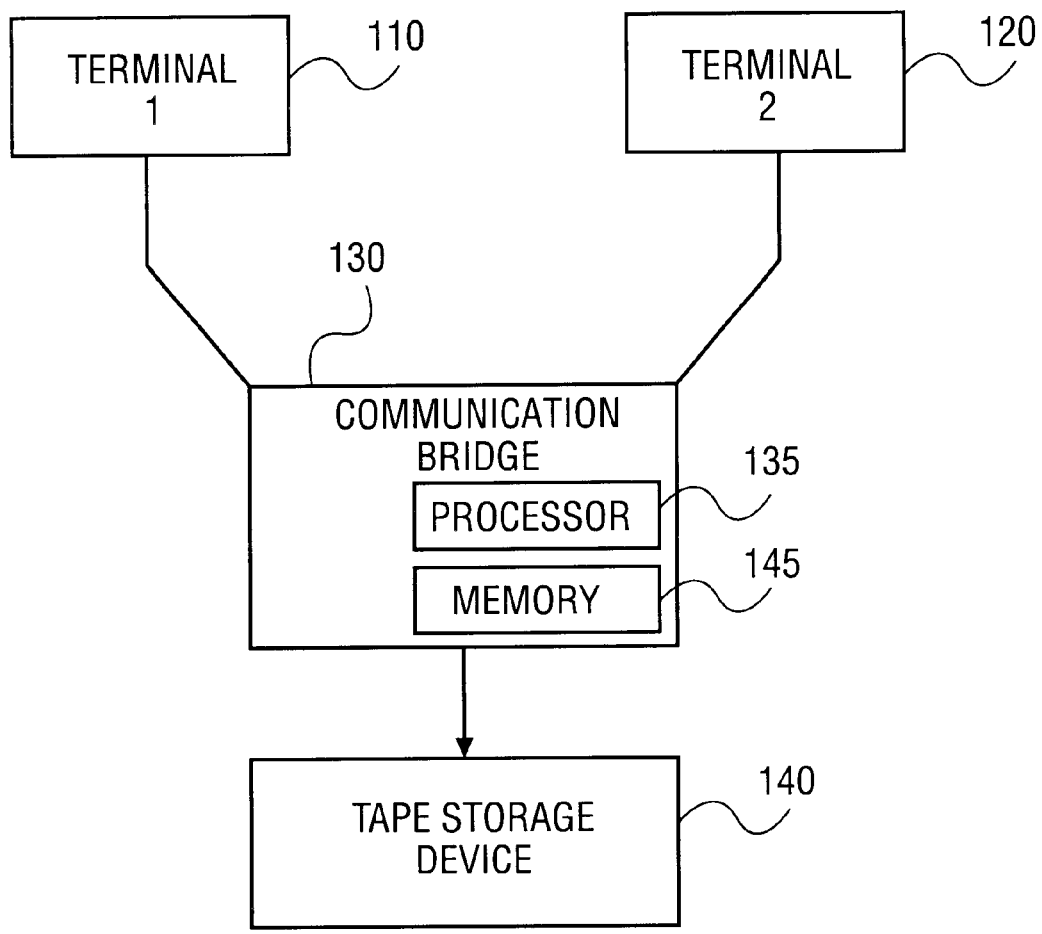
FIG. 1*a* is a simplified block diagram of one embodiment of an apparatus that operates in accordance with the teachings of the present invention.

A method and apparatus for concurrent access to a sequential device are disclosed. In one embodiment, an apparatus includes a tape storage device for storing portions of data to a storage tape, and a logical communication bridge, which receives data from at least one source terminal, assigns a data identifier to the data, and stores a data portion with its data identifier to the tape storage device for subsequent access. In one embodiment, the data identifier is used during data retrieval to guarantee that the data belonging to a particular client is not read by other clients with access to the tape device.

The method described herein attempts to solve the problem of concurrency by changing the logical layout of the tape to encode the host/sender information. For purposes of discussion herein, concurrency is contemplated to encompass real time access including near simultaneity or virtual concurrency. Also for purposes discussion herein, a source will be used interchangeably with host and sender.

With this method and apparatus, there is no need for complicated buffering software, as the data is almost immediately stored. The bridge may be an element of the tape device or a separate component. Additionally, state-of-the-art backup software typically stores information sequentially, i.e., if it needs to back up three clients, it must first back up 1, then back up 2, then back up 3. With a logical approach, all 3 clients can be backed up at once. In one embodiment, data portions of fixed data size are stored, thus, storage and retrieval operations of multiple portions from multiple source devices may be interlaced to provide real time or virtual concurrent access by a number of source devices. Also, since the change is native to the tape, there is no need for large hard drive buffers to store data during physical layout adaptations. There can be a direct connection between the tape device and the network. The system provides for more rapid access to a tape device through the use of data identifiers. The writing of a data identifier to the tape also adds increased reliability and recoverability of data. Additionally, data that is present after the just-written block is preserved during overwrite operations because of limitations placed on data block size changes.

For purposes of discussion herein, a data portion is contemplated to encompass some amount of user data, such as a block of data. For the purposes of discussion herein, a data portion will be interchangeably used with a data block or block. In one embodiment, files over 2K in length, are broken into 2K packets. On the receiving end, the communication bridge reads the incoming Transmission Control Protocol (TCP) headers to retrieve the packet and file size information and buffers the data.

Each data portion is assigned a data identifier, as will be discussed below. In one embodiment, the data identifier is written before a data portion on the tape. The data identifier is also stored in a table of data block location information located in memory on the bridge, or in a Memory in Cassette (MIC) of the tape. A database of meta-information (equivalent to a data allocation table) stores data identifiers and corresponding locations of data portions on the tape.

The data identifier can include a variety of types of information which function to identify the source, destination, or user of the data. In one embodiment, the data identifier includes the IP address of the sender. In another embodiment, the data identifier includes a filename to which the associated data portion belongs. In one embodiment, the data identifier includes a unique username. In another embodiment, the data identifier includes a session ID generated by the client side application at the bridge. The data identifier may also include an encryption key which allows the user to encrypt data before storage, and similarly receive decrypted data when subsequent read operations are performed. In another embodiment, the data identifier includes a data classifier that tells the tape device what type of data to write or read in the upcoming data portion. This enables the bridge to perform data translations as desired.

In one embodiment, the format of the data identifier/data block is application specific and, at the same time, it is Small Computer System Interface (SCSI)/ European Computer Manufacturers Association (ECMA) compliant.

This logical format does not necessarily utilize the writing of Filemark (FM), Setmark (SM), and End of Data (EOD) markers since they are not necessary to store user data over a network. The use of FM and SM in a sequential device can be to allow the host to move to a certain marked position on the tape quickly. For a device providing a networked storage service, this should not be necessary due to the presence of the file location system described herein. Writing of an EOD marker may also not be necessary due to the fixed data portion size and the desire to preserve remaining data after an overwrite. However, if it is required that the drive must be capable of writing a FM, SM, or EOD marker, then the same identity solution can be applied. In other words, the FM, SM, or EOD marker could be preceded with a special header.

FIG. 1a is a simplified block diagram of one embodiment of an apparatus that provides concurrent access in accordance with the teachings of the present invention. Source devices 1 and 2 transmit data to communication bridge 130. Communication bridge 130 assigns a data identifier to each portion of data received. The data and data identifier are stored to tape storage device 140 for subsequent access. The data may be stored in sized portions as received, in a standard size, or a variable size. In one embodiment, the data identifier is used to identify the source of the data.

In one embodiment, communication bridge 130 includes a processor 135 and memory and/or storage source 145. The device 145 stores instructions, which when executed by the processor 135, perform the methods described herein.

Figure 1B:
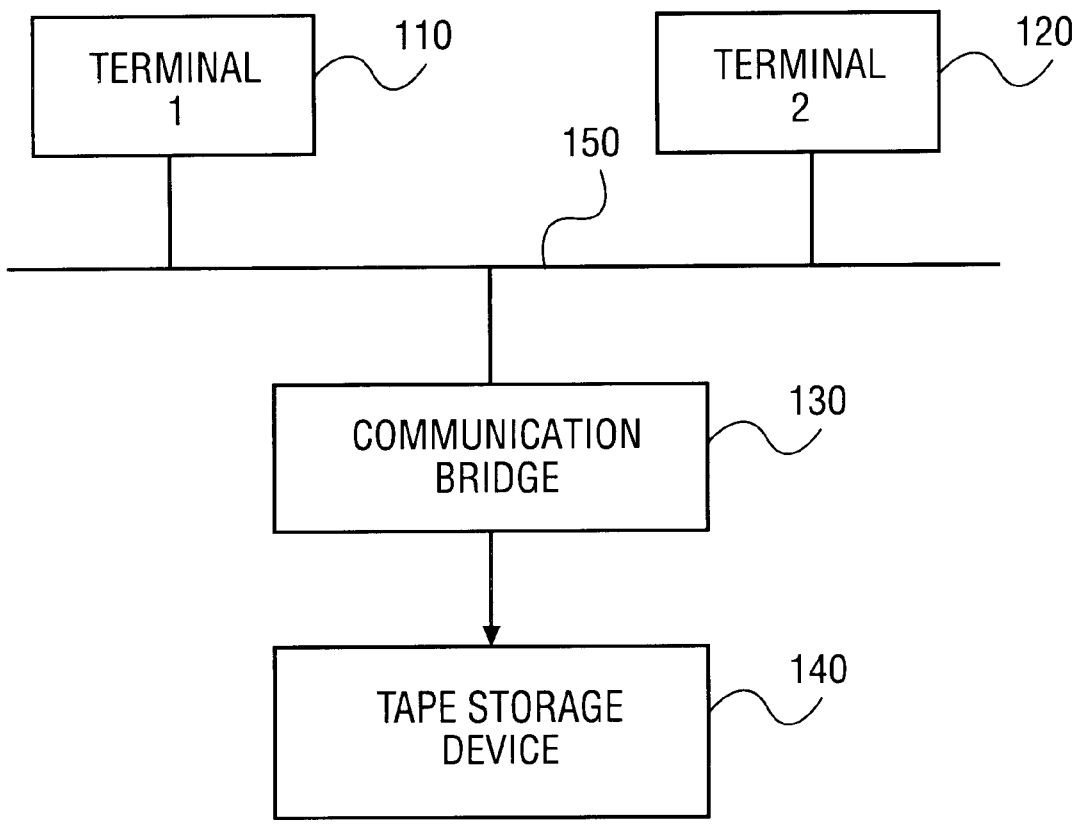
FIG. 1*b* is a simplified block diagram of another embodiment of an apparatus configured with a network.

FIG. 1b shows an alternate embodiment of the apparatus. Source terminals 1 and 2 transmit data to communication bridge 130 over network 150. Communication bridge 130 assigns an data identifier to the data and causes the data and data identifier to be stored to tape storage device 140 for subsequent access.

Figure 2:
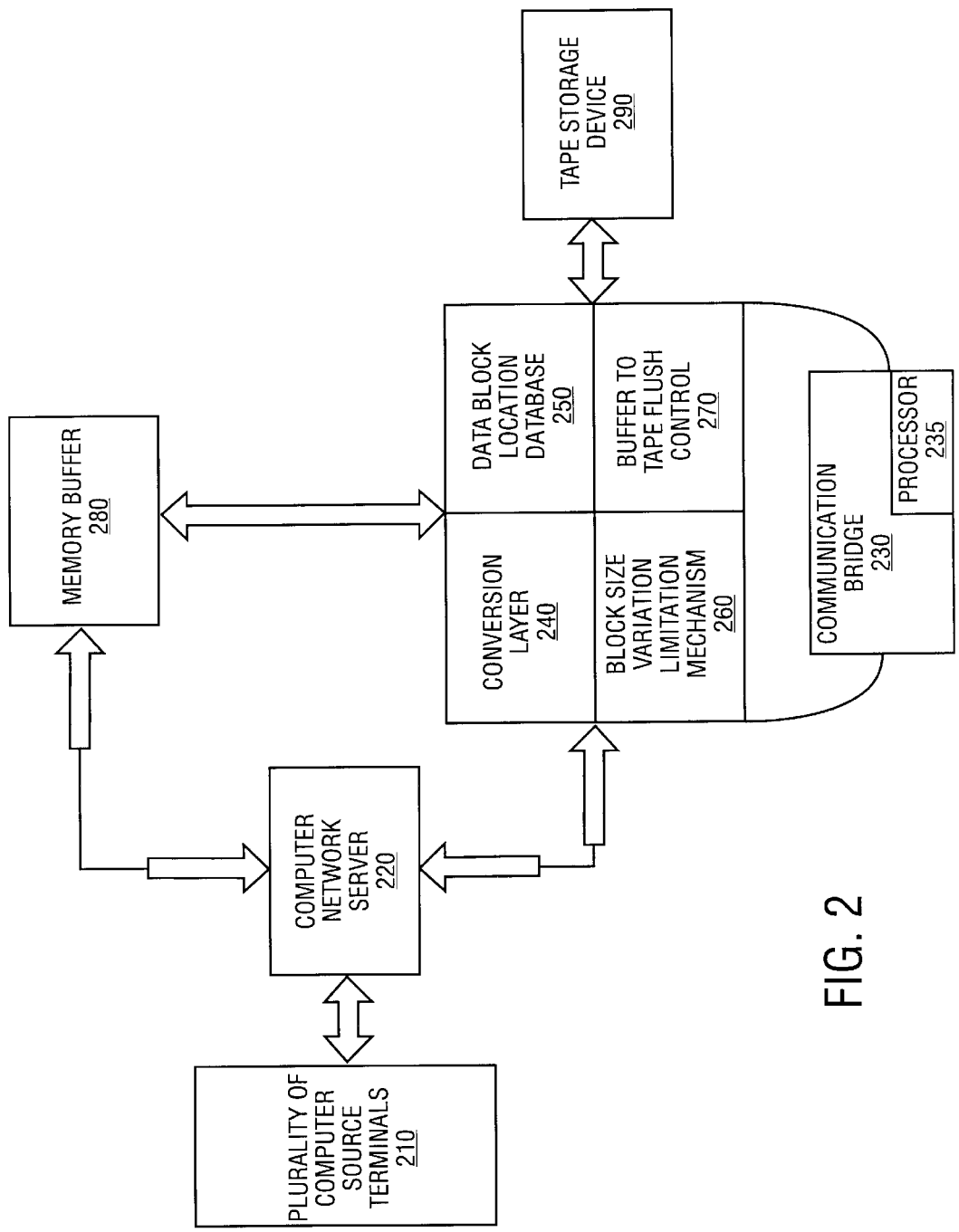
FIG. 2 is a detailed block diagram of one embodiment of an apparatus.

FIG. 2 is a block diagram of one embodiment of a system that provides concurrent access. In one embodiment, the system is configured such that each host participating in a network is uniquely identifiable. A sequential access device can take advantage of this fact, and, in combination with additional parameters, store each unit of data with a special tag or data identifier derived from this information. Each data identifier can help associate the stored data with an identifiable source, preferably a uniquely identifiable source. In one embodiment, a buffer such as a large, external buffer, for example a hard disk, CD ROM or other storage media is used in connection with file location information to provide for concurrent interweaving of data from multiple users to the tape. In one embodiment, the system provides file-based granularity in which data is stored on a file by file basis. Additionally and alternately, a client-based granularity in which data is stored on a user basis, may be used.

In one embodiment, a plurality of source computer terminals 210 connects to computer network server device 220. In one embodiment, the plurality of source terminals 210 are connected over Ethernet. In other embodiments, the plurality of source terminals 210 may be connected over a Wide Area Network (WAN) or Local Area Network (LAN).

Computer network server 220 connects to Communication Bridge (CB) 230. In one embodiment, CB 230 is composed of computer software, which, when executed by the processor 235 of the communication bridge, performs the methods described herein. In one embodiment, CB 230 receives data from at least one source terminal, assigns a unique data identifier to the data, and stores the data identifier and a data block to the tape storage device for subsequent, logical access. In one embodiment, Computer network server 220 is a Web server. In one embodiment, Computer network server 220 is a Dynamic Host Configuration Protocol (DHCP) server. In one embodiment, Computer network server 220 is an Industry Compliance (Jini, Universal Plug and Play (UPNP)) server. In another embodiment, Computer network server 220 is a Proprietary Protocol server. In one embodiment, Computer network server 220 is a Management/Administrative server.

In one embodiment, CB 230 includes conversion layer (CL) 240. Conversion Layer 240 bi-directionally converts data between the network protocol and the internal tape device protocol. In one embodiment, the network protocol is TCP/IP. In one embodiment, the internal tape device protocol is SCSI. In one embodiment, conversion layer 240 is firmware. In one embodiment, CL 240 further creates data identifiers and places them on incoming data.

The tape device can be network enabled, which enablement in one embodiment is a software layer operable between the device and the network. This layer can perform bi-directional conversion of data between TCP/IP protocol (HTTP based) and the internal tape device protocol (currently SCSI), i.e., TCP/IP to SCSI and SCSI to TCP/IP. This layer can know who is sending or requesting the data by examining the HTTP request headers. A data identifier can be created utilizing this and additional information. During write operations, this data identifier can be written to the tape followed by the actual data. For read operations, only the data that matches the identifier is returned to the requester.

CB 230 connects to Tape Storage Device (TSD) 290. In one embodiment, CB 230 is an element of TSD 290. Alternatively, CB 230 is a separate component. In one embodiment, TSD 290 stores data portions. Alternatively, TSD 290 is a Network Attached Storage (NAS) device. In one embodiment, TSD 290 is a sequential access, single tape device. In one embodiment, TSD 290 is an Advanced Intelligent Tape (AIT) tape device.

In one embodiment CB 230 is attached to memory buffer 280 to increase storage performance. The memory buffer 280 may be a volatile or non-volatile memory including a hard drive buffer. In one embodiment, memory buffer 280 is enclosed in the same housing as CB 230.

CB 230 may also include a Buffer to Tape Flush Control (BTFC) 270 to control the flushing of data to tape. Thus, for example, if each TCP packet is 2K in length, any file larger than this is broken into multiple packets before transmission.

On the receiving end, the communication layer (the code between the tape device and the network) reads the incoming TCP headers to retrieve the packet and file size information and buffer the data. This layer may have a buffer available to it for improved storage performance. This buffer, however, should not be confused with an internal tape drive buffer. Since the communication layer has this knowledge, it is possible to implement a dynamic flush behavior. In other words, the flushing of data from buffer to tape can be based on certain criteria such as the file size and the data type of the incoming data. Such a behavior can improve system reliability in a network environment. In one embodiment, the determination of flush frequency is made in CB 230.

In order to manage and facilitate read back of data, CB 230 includes a database of meta-information similar to a file allocation table. The table stores tape location information in connection with data identifiers. As data is written to the tape, the table is updated with at least the starting location of the data on the tape as well as the corresponding data identifier of the data portion. For fixed size data portions, the ending location is not needed. Referring to FIG. 2, CB 230 includes data block location table (DBLT) 250 containing entries to enable read back of data to the user. For the purposes of discussion herein, a data block location table will be interchangeably used with a data block allocation table or data portion allocation table. For example, an entry to DBLT 250 may include some or all of the information contained in a data identifier as well as the starting and possibly the ending locations of a data block being written to the tape.

In one embodiment, CB 230 retrieves a data block from a storage tape by matching its data identifier with data identification parameters listed in an entry to DBLT 250, to retrieve and lookup the corresponding tape location. The data at that location is then accessed and provided to the requesting user. Thus, the CB 230 uses the location information to command the TSD 290 to position itself at a beginning location on the tape and to read data up to an ending location, the ending location determined in accordance with the fixed block size and ending location also stored in the table. In one embodiment, TSD 290 can be commanded to return all the data belonging to host xx.xx.xx.xx between locations y and z. In another embodiment, the data is filtered is by CB 230. In one embodiment, the data is filtered based on file type. For example, if a host only wishes to retrieve all files with the extension .jpg, the CB 230 can filter out all other file types and only return the requested type.

In order to provide data integrity in a multi-user environment, a limit can be placed on changing data block sizes. In a network scenario, an overwrite operation should not be allowed to eliminate any remaining data on the tape. For this reason, variable block lengths should not be allowed under any circumstances, and fixed block sizes typically should not be altered (with an exception given below). With this change, an overwrite operation can write the same length of data as the previous write operation and, as a result, the remaining data can be preserved.

The system may be configured to relax the limitation on fixed block size alteration can be relaxed in the following scenario. The user can use a management tool such as a browser-based management tool to explicitly change the fixed block length. A warning box can be displayed to alert the user that this operation could be dangerous and lead to the loss of data. If the tape device can determine that the tape is blank, then the warning would not be displayed. Allowing this capability can enable the user to tune block sizes for the data being stored for improved performance. For example, if only small images are being stored, then a small block size could be more efficient. On the other hand, if the tape is used to store large Motion Picture Experts Group (MPEG) movies, then a medium to large fixed block size could be more efficient.

In one embodiment, CB 230 has Block Size Variation Limitation Mechanism (BSVLM) 260 to limit block size changes to prevent elimination of data immediately following the just-written block in an overwrite operation. In one embodiment, BSVLM 260 has a warning indicator to alert the user that a block size variation might lead to loss of data. In another embodiment, BSVLM 260 strictly prohibits variations to block size.

Figure 3:
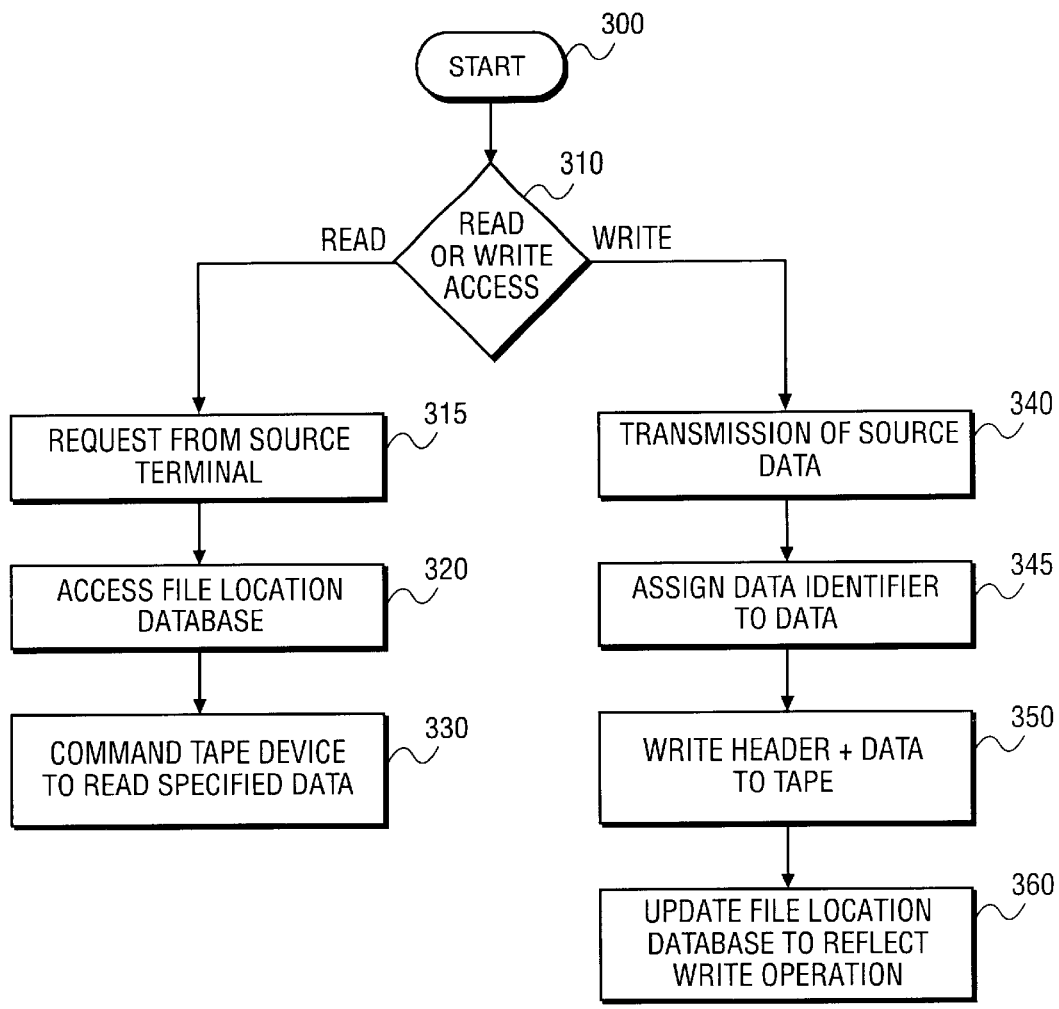
FIG. 3 shows an overview of one embodiment of the method of the present invention.

FIG. 3 shows an overview of one embodiment of a method for accessing data. At Block 310 it is determined whether a read or write operation is to be performed. For example, read requests and write requests for specific data are sent by network coupled source devices. Predetermined fields of incoming requests are reviewed to determine the type of operation to be performed.

At step 315, a source device gives a request for data to the communication bridge. In one embodiment, a request for data includes a file number or other type of identification. The communication layer also knows the source of the request.

At step 320, the request information is used to access the data block location table to retrieve file storage location information. In one embodiment, for large file requests, it is determined prior to accessing the file storage location if the file is composed of multiple data portions. Thus, if the file is composed of multiple portions, the portions are also retrieved through access of the data block location table.

At step 330, using the file storage location information, the tape device is controlled to position itself at a beginning location on the tape and to read the data up to an ending location. For example, the tape device may be controlled to return all the data belonging to source xx.xx.xx.xx between locations y and z. The retrieved data may be filtered by the communication layer.

Beginning at step 340, a write operation is performed and at least one data portion is transmitted from a source device to the communication layer. Alternately, a larger composition of data is transmitted which is broken down by the communication layer into smaller, appropriate sized portions. In another embodiment, a larger composition of data is broken down by the source device into smaller portions before transmission. In either case, the data block location table can identify the multiple data portion locations for a particular file and, during a read-back operation, the communication layer knows to recombine the smaller portions.

At step 345, a data identifier is assigned to each data portion to be written to the tape, and at step 350, the data portion and data identifier are written to a storage tape. At step 360, the data block location table is updated to reflect the preceding write operation by adding the new data identification and location information.

The invention has been described in conjunction with at least one embodiment. It is evident that numerous alternatives, modifications, variations and uses will be apparent to those skilled in the art in light of the foregoing description.

What is claimed is:

1. An apparatus comprising:
   a communication bridge to receive portions of data from a plurality of source devices, assign a unique data identifier to each portion of data that identifies the source of the portion, and cause each portion of data and the corresponding data identifier to be contiguously stored to a tape storage device to encode the logical layout of the tape with source device information, wherein the portions of data and corresponding data identifiers are interleaved by source on the tape.

2. An apparatus comprising:
   a tape storage device for storing data; and a communication bridge coupled to the tape storage device and to a plurality of source devices which provide data to be stored, said communication bridge receiving portions of data from the source devices, said communication bridge assigning a unique data identifier to each portion of data indicative of the source of the data to be stored, said communication bridge causing each portion of data and the corresponding data identifier to be contiguously stored to the tape storage device, wherein the portions of data and the corresponding data identifiers are interleaved by source on the tape.

3. The apparatus of claim 2, wherein each source is selected from the group consisting of the source devices and users of source devices.

4. The apparatus of claim 2, wherein a plurality of users provide data through the plurality of source devices.

5. The apparatus of claim 2, wherein information in the data identifier is selected from the group consisting of:

an IP address of the sender;

a filename to which an associated data portion belongs;

a unique username;

a session ID generated by a user application;

an encryption key which allows the user to encrypt data; and a data classifier that tells the tape device what type of data to write or read in the upcoming portion.

6. The apparatus of claim 2, wherein the communication bridge is coupled to the source devices through a network and said communication bridge further comprises:

a conversion layer to bi-directionally convert data between a network protocol and an internal tape device protocol.

7. The apparatus of claim 2, wherein the communication bridge further comprises:

a data block allocation table containing entries to enable read back of data to the user, said communication bridge referencing a specified tape location corresponding to the data identifier.

8. The apparatus of claim 7, wherein information contained in the entry to the data block allocation table is selected from a group consisting of:

a starting location for a portion of data written to the tape;

an ending location for a portion of data written to the tape;

an IP address of one of the plurality of source devices requesting a read operation or write operation to the tape device;

a filename to which the associated data portion belongs;

a unique username;

a session ID generated by a user application;

an encryption key which allows a user to encrypt data; and a data classifier that tells the tape device what type of data to read in the upcoming data portion.

9. The apparatus of claim 7, wherein the system provides granularity selected from the group consisting of the file-based granularity and user-based granularity.

10. The apparatus of claim 7, wherein the communication bridge retrieves a portion of data from a storage tape by matching the corresponding data identifier with information contained in the data block allocation table.

11. The apparatus of claim 2, wherein the tape device comprises a sequential access, single tape device.

12. The apparatus of claim 2, further comprising:

an external memory buffer coupled to the communication bridge to selectively buffer incoming and outgoing portions of data.

13. In a system comprising a plurality of source devices and a tape device coupled through a network, a method for execution by a communications bridge coupling the tape device to the network for perceived concurrent access of the tape device by the plurality of source devices, the method comprising:

assigning a unique data identifier to each data portion written to the tape device to identify a source for each portion of data received from a source device;

generating a data allocation table comprising the data identifiers and corresponding locations of the data portions on the tape; and responding to a write operation by writing the data identifier corresponding to a data portion contiguously to the data portion to the tape device and writing the data identifier and tape location of the data portion to the data allocation table, wherein the data portions and the corresponding data identifiers are interleaved by source on the tape.

14. The method of claim 13, further comprising:

sending a portion of data with a corresponding data identifier; and flushing a portion of data with the corresponding data identifier from a memory buffer to a storage tape according to file size and data type.

15. The method of claim 13, further comprising:

retrieving a portion of data from the storage tape during a read operation using information from the data allocation table.

16. The method of claim 13, wherein the read operation further comprises:

controlling the tape device to position itself at a beginning location on the tape and to read the data up to an ending location using information from the data allocation table.

17. The method of claim 13, further comprising:

limiting size changes of portions of data written to tape; and warning the user that a data portion size variation might lead to a loss of data.

18. The method of claim 13, further comprising if the data allocation table is not referenced, determining the location of the tape to read by comparing the data identifier with the data identifiers on the tape.

* * * * *